Jan. 28, 1969  F. D. DUERST  3,423,869
BAIT CONTAINER
Filed Sept. 2, 1966
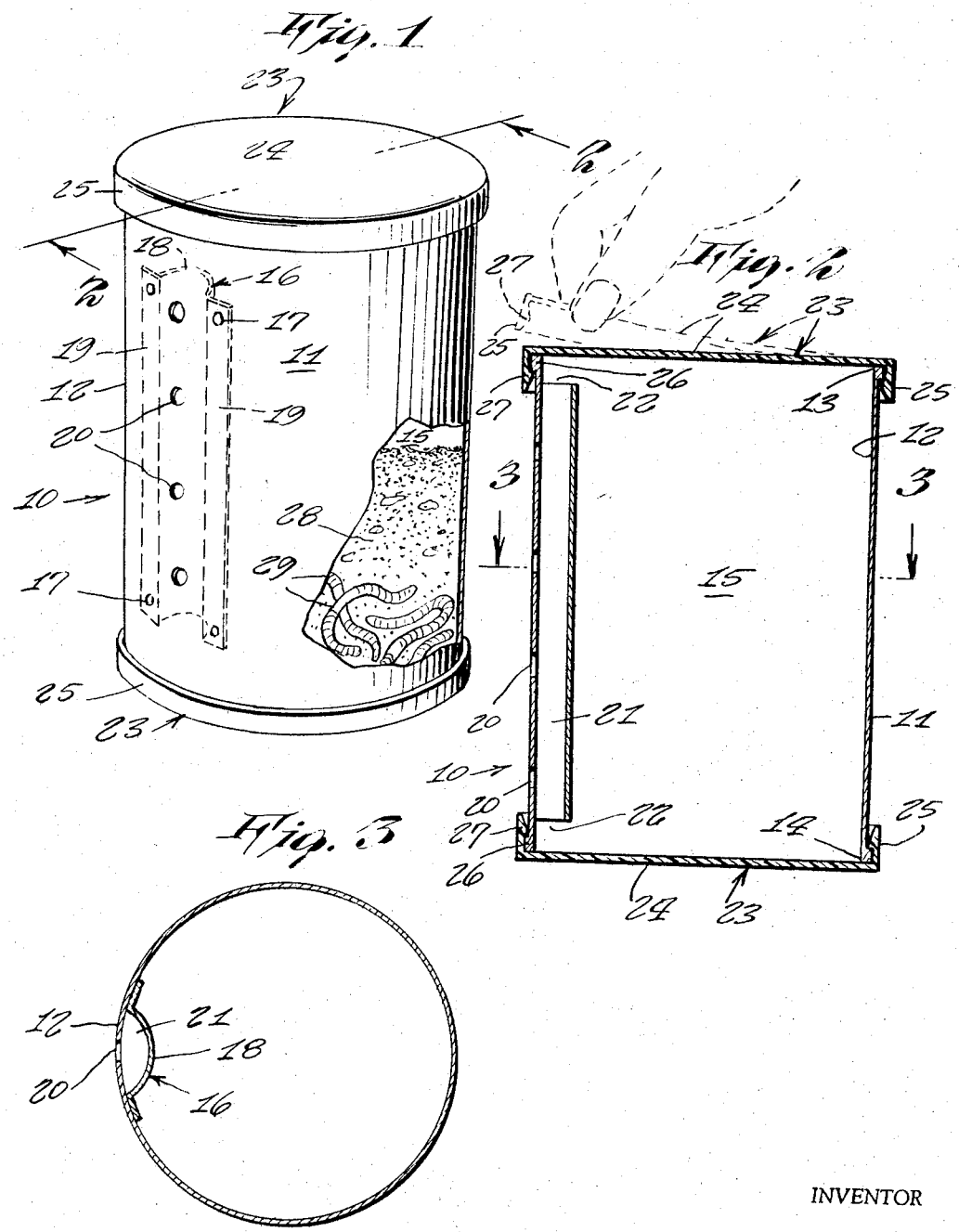
INVENTOR
FRED D. DUERST

United States Patent Office 3,423,869
Patented Jan. 28, 1969

3,423,869
BAIT CONTAINER
Fred D. Duerst, Rte. 1, Box 84–E, Bonnie Lane,
Madison, Wis. 53704
Filed Sept. 2, 1966, Ser. No. 576,996
U.S. Cl. 43—55
Int. Cl. A01k 97/04
1 Claim

ABSTRACT OF THE DISCLOSURE

A can for a bait worm including a cylindrical side wall with a removable lid at each opposite end; a straight length of U-shaped rib secured to the inner side of the side wall in alignment with openings provided in the side wall, the rib being shorter in length than the length of the side wall so to form a recess between the rib ends and each lid.

---

This invention relates generally to fishermen's accessories. More specifically it relates to containers for bait.

It is generally well known to those skilled in the art that worms are a bait commonly used by fishermen and these are usually carried in a container so that the fishermen may conveniently reach thereinto for obtaining a worm and baiting the same upon the fish hook. Such bait cans are usually provided with a quantity of earth or mulch within which the worm may burrow so that his body may be kept moist and alive. It is of course well known that the worms accordingly will go to the bottom of the can or container where it is generally difficult for the fishermen to dig in and reach them.

Accordingly it is a principal object of the present invention to provide an upside down worm can for fishing worms which has self-contained means for getting the worms to the upper part of the can or container when the fisherman desires to reach for a worm.

Another object of the present invention is to provide an upside down worm can having a removable upper and lower lid, and wherein the can may be first inverted to place the worms on top and after which the can lid which is now on top may be removed so to provide access to the worms.

Yet another object of the present invention is to provide an upside down worm can having self-contained means for providing an ingress of air into the can so that the worms may breath.

Yet another object of the present invention is to provide an upside down worm can wherein the top and bottom are identical.

Other objects of the present invention are to provide an upside down worm can which is simple in design, inexpensive to manufacture, rugged in construction, easy to use and efficient in operation.

These and other objects will be readily evident upon a study of the following specifications and the accompanying drawing wherein:

FIGURE 1 is a perspective view of the present invention shown partly in cross-section;

FIGURE 2 is a cross sectional view taken on the line 2—2 of FIGURE 1; and showing in phantom lines the lid being removed therefrom;

FIGURE 3 is a cross sectional view taken on the line 3—3 of FIGURE 2.

Referring now to the drawing in detail the numeral 10 represents an upside down worm can according to the present invention wherein there is a cylindrical main body member 11 and including a cylindrical side wall 12 having an upper edge 13 defining an upper opening, a bottom edge 14 defining a bottom opening, the openings communicating with a central chamber 15.

A semi-cylindrical rib 16 is mounted by means of rivets 17 against the inner side of the side wall 12, the rib 16 having a semi-cylindrical portion 18 and a vertical tab 19 adjacent each side thereof. The side wall 12 has a plurality of spaced apart openings 20 therethrough, each of which is approximately one-eighth inch in diameter. The openings 20 are in alignment with a semi-cylindrical space 21 between the side wall 12 and semi-cylindrical portion 18 of the rib. Thus air for the purpose of breathing is delivered through openings 20 and the space 21 into the interior chamber 15 so that the worms may breath. It will be noted that a relief space 22 is provided at each end of the main body member so to allow the air to transfer from the space 21 into the chamber 15. Preferably the relief space 22 and the openings 20 are of a size so as to prevent an earth worm to enter there into, thereby confining the worms within the chamber 15.

The rib 16 and the main body member 11 may be made from sheet metal material or plastic as preferred.

Adjacent each end of the main body member there is a lid 23 comprised of a circular flat portion 24 and having a flange 25 which can snap over the edge of the main body member. The main body member may be provided with a protruding bead 26 and the flange may be provided with protruding bead 27, the beads snapping over each other. While the lids may be made of any material preferred, they may be best made of resilient flexible plastic for best results so that they may snap over the ends of the main body member.

In operative use a quantity of earth or mulch 28 is placed within the chamber 15 and a number of worms 29 are then also placed into the container. In due time the earth worms will burrow their way toward the bottom of the earth or mulch, as shown in FIGURE 1 of the drawing. When the fisherman wishes to obtain a worm for placing upon his fishing hook, he first turns the can upside down, thereby placing the worms at the top of the mulch or earth. He then removes the lid which is now on top, as indicated by the phantom lines in FIGURE 2 of the drawing. He now has ready access for picking up one of the worms, without the necessity of digging into the earth of the mulch.

While various changes may be made in the detailed construction it is understood that such changes will be within the scope and spirit of the present invention as is defined by the annexed claim.

I claim:

1. In a live fishing worm container, the combination of a main body member, a pair of lids, said lids being removably affixed to opposite ends of said main body member, said main body member including a central chamber for containing fishing worms and a quantity of earth or mulch, said main body member comprising a cylindrical member having a cylindrical side wall, said cylindrical side wall having an upper and lower edge, said edges defining openings at each end of said main body member, said openings communicating with said central chamber within said main body member, and said upper edge and lower edge each having a bead for interlocking with said lids, each of said lids comprising a flat circular member, a peripheral flange around said flat portion thereof, said flange having a bead for interlocking with said bead on each end of said main body member, a longitudinal rib being secured to the inner side of said side wall of said main body member said rib comprising a semi-cylindrical element having a tab along each side edge thereof with openings through each of said tabs for receiving rivets for securing said rib to said side wall of said main body member, said rib enclosing a semi-cylindrical space between said main body member side wall and said semi-cylindrical rib, a plurality of openings in spaced apart relation in said side wall of said main body member and in alignment with said semi-cylindrical space, and said rib being of shorter length than the height of said side wall, thus forming a relief at each opposite end between said lids and rib so to permit air to circulate through said openings in said side wall, through said semi-cylindrical space, and through said relief at each end into said central chamber.

References Cited

UNITED STATES PATENTS

| | | |
|---|---|---|
| 373,433 | 11/1887 | Bord et al. |
| 2,326,414 | 8/1943 | Thompson. |
| 2,630,651 | 3/1953 | McGee _____ 43—55 |
| 2,867,055 | 1/1959 | Lebiedzinski _____ 43—55 |
| 3,006,106 | 10/1961 | Shuler _____ 43—55 |

HUGH R. CHAMBLEE, *Primary Examiner.*